United States Patent
Dice et al.

(10) Patent No.: US 6,862,674 B2
(45) Date of Patent: Mar. 1, 2005

(54) METHODS AND APPARATUS FOR PERFORMING A MEMORY MANAGEMENT TECHNIQUE

(75) Inventors: David Dice, Foxborough, MA (US); Alexander T. Garthwaite, Beverly, MA (US)

(73) Assignee: Sun Microsystems, Santa Clara, CA (US)

( * ) Notice: Subject to any disclaimer, the term of this patent is extended or adjusted under 35 U.S.C. 154(b) by 242 days.

(21) Appl. No.: 10/163,677

(22) Filed: Jun. 6, 2002

(65) Prior Publication Data

US 2003/0229766 A1 Dec. 11, 2003

(51) Int. Cl.[7] .............................................. G06F 12/00
(52) U.S. Cl. ...................... 711/170; 711/154; 711/173; 707/206; 707/205
(58) Field of Search ............................... 711/170, 173, 711/154; 707/206, 205; 717/148

(56) References Cited

U.S. PATENT DOCUMENTS

| | | | | |
|---|---|---|---|---|
| 6,052,699 A | * | 4/2000 | Huelsbergen et al. ....... 707/206 |
| 6,253,215 B1 | * | 6/2001 | Agesen et al. .............. 707/206 |
| 6,304,949 B1 | * | 10/2001 | Houlsdworth ............... 711/170 |
| 6,327,701 B2 | * | 12/2001 | Ungar ........................ 717/125 |
| 6,658,652 B1 | * | 12/2003 | Alexander et al. .......... 707/206 |

* cited by examiner

Primary Examiner—Hong Kim
(74) Attorney, Agent, or Firm—Barry W. Chapin, Esq.; Chapin & Huang, LLC

(57) ABSTRACT

Mechanisms and techniques operate in a computerized device to perform a memory management technique such as garbage collection. The mechanisms and techniques operate to detect, within a storage structure associated with a thread, general memory references that reference storage locations in a general memory area such as a heap. The storage structure may be a stack utilized by the thread, which may be, for example, a Java thread, during operation of the thread in the computerized device. The system maintains a reference structure containing an association to the general memory area for each detected general memory reference within the storage structure. The system then operates a memory management technique on the general memory area for locations in the general memory area other than those for which an association to the general memory area is maintained in the reference structure, thus increasing the performance of the memory management technique.

41 Claims, 7 Drawing Sheets

US 6,862,674 B2

METHODS AND APPARATUS FOR PERFORMING A MEMORY MANAGEMENT TECHNIQUE

FIELD OF THE INVENTION

The present invention generally relates to systems for performing memory management techniques within a computerized device, and more particularly, to systems, mechanisms and techniques that perform garbage collection of memory during operation of the computerized device.

BACKGROUND OF THE INVENTION

Conventional computerized devices include a processor (e.g., microprocessor, controller or central processing unit) that is capable of executing, interpreting, operating or otherwise performing computer program instructions (e.g., software code) associated with computer programs stored in a memory system within the computerized device. During execution of a computer program, instructions in the computer program may direct the processor to allocate various portions of memory in order to store data structures for use by the computer program. As an example, in the C programming language, a programmer can provide a malloc instruction for use with a data structure variable name as a parameter in order to cause the computerized device to reserve an area of memory equivalent in size to the data structure for use by the program containing the malloc instruction. Once the computer program is finished using the data structure, the programmer that created the computer program can include a free instruction that causes the processor to release the memory formerly allocated to the data structure for use by subsequent allocation requests within the computerized device.

Some conventional execution environments that operate within computerized devices automatically control the allocation and deallocation or release of memory on behalf of computer program processes. In such cases, the programmer does not need to provide specific instructions to allocate and deallocate memory. As an example, in the Java programming language (Java is a registered trademark of Sun Microsystems, Inc.), a programmer can create a program such as a Java applet and can create or define objects (i.e., data structures) in the Java applet as needed, without being concerned about the allocation or deallocation (i.e., release) of memory required to store and/or maintain the objects and associated data during operation of the Java applet. Instead, during runtime, the Java applet operates on a computerized device within an execution environment called a Java virtual machine or JVM. A conventional Java virtual machine interprets the Java computer program code within the Java applet and handles all processing operations associated with allocating or reserving memory on behalf of the Java applet for objects instantiated by that Java applet. In addition, a conventional Java virtual machine performs a periodic memory management technique called "garbage collection" in order to traverse memory and deallocate portions of memory which store object data that is no longer referenced by any objects in any Java processes or threads (e.g., by any applets). In this manner, the automatic memory allocation and deallocation mechanisms or garbage collection techniques operate as part of the Java virtual machine in order to handle allocation and deallocation of memory on behalf of Java processes or threads.

Continuing with the aforementioned example of a Java thread or process operating within a Java virtual machine, a conventional Java virtual machine provides a storage structure such as a stack to the Java thread. During operation of the Java thread, the Java virtual machine, on behalf of the Java thread or process, can place information onto (i.e., push) and off-of (i.e., pop) the stack on behalf of the Java thread associated with that stack. As a specific example, if a Java thread instantiates a series of objects A, B and C, the Java virtual machine allocates memory for each of these objects in a general memory area referred to as a heap. During operation of the Java thread, the Java virtual machine can reference the objects in a heap via pointers to those objects. The Java thread may perhaps call or otherwise transfer processing to another routine. In such cases, a conventional Java virtual machine may place references to the objects A, B and C associated with the Java thread onto a call-stack associated with the Java thread prior to the transfer of processing into the routine. The stack or call-stack thus contains such things as local variables, some of which may be references into the heap, and any intermediate but still live results saved from registers at a particular program counter location.

In other cases, an operating system might instruct the Java virtual machine to begin operation or execution (e.g., interpretation) of another Java thread. The first Java thread from which control was transferred may enter an idle or passive state or condition for an indefinite period of time. Perhaps the first Java thread becomes blocked while awaiting an event to occur. Information may be pushed onto the stack when a thread enters an idle condition. Within the Java execution environment, there may be many threads existing at any point in time. The stack associated with each of these Java threads may contain references to the general memory area or heap for objects associated with those threads.

As noted above, in a typical conventional Java virtual machine, each Java thread has a stack. The stack is composed of a set of frames, sometimes called activation records. Each frame consists of a set of cells or words. For the purposes of stack scanning, a word contains either a reference (root) to an object in the heap or a non-reference value. Example of non-reference values include integers, floating point values, return addresses, and the like. Frames are private to a thread and thus only a thread or the garbage collector may modify the cells contents of a frame. A frame is usually associated with a Java method (e.g., a routine or subroutine). When a thread is executing in a Java method, the corresponding frame is active. The active frame is always the topmost frame on the stack. A thread is not able to modify the contents of non-active frames.

As an example, suppose mA, mB, mC and mD are Java methods. Futher suppose mA calls into a mB, and mB calls into mC, and mC then calls into mD. Conceptually, the stack will then look like: {fA, fB, fC, fD)}, where fA is the frame associated with Java method mA, fB is the frame associated with Java method mB, and so forth. The frame fD (at the top of the stack) is the active frame while fA is the oldest frame. While fD is active the thread can't access the contents of frames fA, fB, fC. More specifically, the thread can't "name" the locations so it can't refer to them. When mD returns control into mC, we say the stack unwinds. At this point, the stack will have the following form: {fA, fB, fC} and the frame fC is the active frame.

As noted above, the Java virtual machine is responsible for deallocating memory on behalf of Java threads. To do so, the Java virtual machine typically performs a conventional garbage collection memory management technique for threads associated with the Java virtual machine. Such a conventional garbage collection memory management technique involves identifying or differentiating those portions of the heap or other general memory area that are no longer referenced by any Java threads as opposed to those portions of memory that are allocated to storing objects on behalf of thread. By identifying the used versus the unused areas of memory, some garbage collection technique can maintain a free list of the unused memory portions or areas for later use when an active or executing Java thread requires the instantiation of a new object in memory.

One technique used by conventional garbage collection memory management techniques to identify those areas of a heap that contain allocated memory (i.e., that contain object data in use by threads) operates by scanning the stacks associated with all threads in order to identify all references to objects in the heap. Those areas or portions of the heap that are not referenced within any of the stacks associated with the threads within that Java virtual machine are considered to be garbage. In other words, upon each operation of garbage collection, by scanning the stacks associated with the threads in a Java virtual machine, the garbage collection technique can identify all areas of the heap that are in use and thus those areas not identified are considered to be free memory and may be freely allocated upon the next request for heap memory.

Conventional stack scanning operations are transitive in that if a root reference (i.e., a reference to heap memory stored outside of the heap, such as in the stack) references a heap object (e.g., object A) which contains an intra-heap reference to another object (e.g., object B), the scan operation will note or otherwise detect that both objects A and B are reachable from the root. The scanning operation thus "traces" intra-object references to determine reachable heap memory portions.

During the process of garbage collection, some conventional garbage collection techniques, called "moving" or "copying" garbage collectors, go so far as to rearrange the general memory area (i.e., the heap) in order to coalesce or condense all areas of free memory (i.e., those areas not allocated to objects associated with threads) into a single contiguous area of free memory within the general memory area. This significantly overcomes a problem of memory fragmentation that occurs when there are many smaller non-contiguous portions of free memory. The garbage collection processing can thus move allocated portions of memory around (i.e., can mode data associated with objects) in order to group this allocated data into a single contiguous portion of allocated memory. The result is to thus collect many small unused but noncontiguous portions of free memory in order to make large portions of continuous free memory available should a need arise to allocate such memory. However, if a conventional garbage collection technique moves data within the heap that is allocated to an object associated with a thread (i.e., moves an existing object that is not garbage) in order to coalesce free memory, the conventional garbage collection technique must keep track of memory addresses before and after the move of the object data within the heap. Once the heap has been rearranged in order to group free memory into one or more large contiguous portions, the conventional garbage collection technique must return to the stacks of each thread in order to update the references (i.e., pointers or memory addresses) within those stacks to correctly point to or reference each object that was moved within the heap during the garbage collection process. In other words, if a conventional garbage collection process moves objects around within the heap, the garbage collection process must update the new locations of those objects within the stacks associated with the threads so that those threads can properly reference those objects. Conventional copying or moving garbage collectors can also adjust intra-heap (e.g., intra-object) references when object are moved during the garbage collection process.

SUMMARY OF THE INVENTION

Conventional techniques and mechanisms for performing memory management techniques such as garbage collection suffer from a variety of deficiencies. In particular, within an execution environment such as a Java virtual machine, upon each operation of a conventional garbage collection technique, the garbage collector (e.g., a routine, thread or process responsible for performing this operation) must scan the stacks of Java threads in order to detect references to objects or other information stored within the general memory area. This stack scanning process or operation requires significant processing resources. As noted above, situations may arise in which many threads become idle or blocked for extended periods of time in a computerized device. In such cases, each time the Java virtual machine performs the garbage collection technique, all stack information associated with each thread must be re-scanned in order to detect storage location references within the stacks associated with those threads to determine which portions of the general memory area are not considered garbage. When many threads are idle for extended periods of time, the processing resources required to scan the stacks of the idle threads can significantly degrade performance of the Java virtual machine each time the periodic process of garbage collection is performed.

It may be the case that certain threads become blocked or remain idle over a period of time during which the Java virtual machine performs multiple garbage collection cycles. Using conventional garbage collection techniques, each time garbage collection processing is performed, the garbage collector re-scans the stacks of all threads including those threads that may have been in an idle state since the last performance of garbage collection processing. This can take considerable time since a stack associated with a thread can contain other data or information besides the general memory references of concern to the garbage collection technique. When performing the scan of a stack to detect the general memory references, the conventional garbage collection technique must scan over or bypass this other data or information within the stack such as variable values pushed onto the stack, since this data does not represent a general memory reference. Accordingly, conventional garbage collection stack scanning techniques impose performance constraints on an execution environment such as a Java virtual machine due to the requirement of detecting all general memory references each time during the garbage collection stack scanning process. In other words, conventional stack scanning constitutes a performance penalty or cost even though a thread is passive or idle, and even in situations where idle threads remain idle for multiple iterations of garbage collection. A large number of idle threads can form a scalability barrier to peak performance of an execution environment such as a Java virtual machine.

Conventional garbage collection techniques also suffer a deficiency in that they re-scan stack information looking for references to the general memory area each time they perform, even though it may be the case that portions of the stack information for a particular thread that cycles between idle and non-idle (i.e., that is performed or operated for a period of time) does not change. That is, if a thread is idle, its stack content does not change during non-operation of the thread. However, when the thread is non-idle and is operating (e.g., an applet being interpreted by a Java virtual machine), content within its stack can change. However, the thread may return to an idle condition and it may be the case that a portion of the contents of the stack does not change from the state that it existed in since the last idle state of that thread. Conventional techniques for performing garbage collection do not recognize these facts and thus suffer from performance problems due to re-scanning the entire stack for each idle thread upon each operation of the garbage collection technique.

Embodiments of the invention are based, in part, on the observation that threads that remain continuously idle over the course of multiple garbage collection cycles have associated or corresponding stack information that does not change. In addition, some embodiments are also based in part on the observation that certain portions of the contents of a stack might not change, even if a thread moves or transitions from an idle condition to a non-idle or operational state and then transitions back to an idle condition. To significantly overcome the deficiencies of conventional memory management techniques such as garbage collection, embodiments of the invention provide a new structure called a "reference structure". Embodiments of the invention can detect all references in stacks for idle threads to the general memory area and can place associations in the reference structure to these references and to the objects in memory that they reference. Then, upon operation of a memory management technique such as garbage collection, the garbage collection process can consult the reference structure instead of scanning all stacks of idle threads to determine what portions of memory are already allocated. This saves considerable processing time.

Embodiments of the invention thus provide mechanisms and techniques for performing a memory management technique such as garbage collection by creating a reference structure that stores or otherwise maintains references to the general memory area or heap on behalf of threads, processes, routines or other threads that have associated idle conditions. Embodiments of the invention thus avoid having to rescan stack information associated with idle thread during successive iterations of a memory management technique such as garbage collection. By "remembering" references to the general memory area associated within the idle threads (e.g., idle Java threads) for those threads that remain idle for multiple garbage collection cycles, stack scanning is reduced to a one time scan to initially detect such references. Thereafter, iterations of the garbage collection technique can maintain and utilize the reference structure containing only those references to the general memory area associated with the idle thread for future iterations (e.g., operations) of the memory management technique, without having to traverse or rescan the entire stack each time garbage collection is performed.

More specifically, embodiments of the invention operate within a computerized device and provide techniques and mechanisms for performing a memory management technique such as garbage collection. In one such embodiment, a method comprises the step of identifying an idle condition associated with a thread. The thread may be, for example, a thread such as a Java thread operating within a Java virtual machine execution environment. The method may identify the idle condition, for example, by detecting that the thread has not been operated in the computerized device for a predetermined period of time. Alternatively, the method may identify the idle condition for a particular thread by detecting that the thread has not been operated by the computerized device during performance(s) of the memory management technique (e.g., garbage collection) for at least one other thread. That is, the method may consider the idle condition to be present for a particular thread if the thread remains continuously idle for a number of iterations of the garbage collection process.

In response to identifying the idle condition associated with the thread, the method proceeds to detect, within a storage structure associated with a thread, general memory references that reference storage locations in a general memory area. The storage structure may be a stack, for example, that the thread utilizes during operation (i.e., during non-idle conditions) in the computerized device. The detected general memory references may be, for example, references within stack cells to objects stored within the general memory area, which may be a heap. In one embodiment, to detect the general memory references, the method traverses the stack associated with the thread to identify all stack cells in the stack that reference storage locations of objects in the general memory area. In this manner, comprehensive or complete stack scanning is not required.

The method maintains a reference structure containing an association to the general memory area for each detected general memory reference within the storage structure. In one embodiment, the method maintains the reference structure by creating an association to the general memory area in the reference structure for each storage location of an object in the general memory area that is referenced by at least one stack cell in the stack. Each entry or association maintained in the reference structure may be, for example, a copy of the contents of the stack cell containing the detected general memory reference or, alternatively, may be a pointer to the stack cell containing the detected general memory reference. In particular, in one embodiment, the reference structure is a root array reference structure and the association to the general memory area maintained for each detected general memory reference is a copy of the contents of the detected general memory reference from the storage structure. In another embodiment, the reference structure is a summary reference structure and the association to the general memory area maintained for each detected general memory reference is a pointer to at least one location in the storage structure that contains the detected general memory references. The reference structure thus contains a consolidated list of associations between general memory references to the general memory area (e.g., a heap) and their locations within the storage structure, such as a stack, associated within the idle thread such as a Java thread. In one embodiment, there may be a single association for multiple general memory references that reference the same object in the general memory area.

After creation of the reference structure, the method operates a memory management technique on the general memory area for locations in the general memory area other than those for which an association to the general memory area is maintained in the reference structure. In other words, the memory management technique locates areas that are not reachable from any roots. The memory management technique may be, for example, a garbage collection routine, thread, process or technique that modifies the general memory area to deallocate storage locations in the general memory area for use by threads. In other words, the memory management technique utilizes the reference structure to identify (i.e., either directly or transitively via intra-heap references) those portions of the general memory area that are in use (i.e., are allocated and are thus not garbage) by threads (e.g., idle threads) so that it can free unallocated areas of memory (i.e., so that it can collect garbage).

The memory management technique may modify portions of the general memory area during its operation. As an example, those portions of the general memory area not identified by associations contained within the reference structure may be consolidated in order to create contiguous portions of free memory. This may include moving objects referenced by the associations in the reference structure to different locations in the general memory area. In such cases, according to one embodiment of the invention, the method updates the reference structure to account for modifications, made to storage locations in the general memory area, during operation of the memory management technique. In this manner, this embodiment accurately maintains the associations within the reference structure (associations between stack cell references and the data in the general memory area) even though the memory management technique modifies the general memory area including portions of memory related to those associations.

After the memory management technique (e.g., garbage collection) completes its operation, certain threads may remain in an idle or blocked condition. This idle condition for one or more threads may continue until the next iteration of the memory management technique. Accordingly, in one embodiment of the invention, the step of operating a memory management technique is repeated during a continuous idle condition associated with the thread such that the repeated step of operating the memory management technique utilizes the reference structure associated with the thread without requiring performance of the step of detecting the general memory references within the storage structure for each repeated step of the memory management technique. In other words, in this embodiment of the invention, once the reference structure is created and maintained on behalf of an idle thread, and while this thread remains continuously idle, each successive iteration or operation of the memory management technique such as garbage collection utilizes the reference structure instead of performing the stack scanning operation. Since the reference structure contains the required information to identify those portions of the general memory area in use, or that are allocated to the idle thread (e.g., thread), performance of the memory management technique is significantly increased since there is no requirement to rescan the storage structure (e.g., the stack).

At some point, a thread may transition from its idle condition to a non-idle condition in order to operate within the execution environment. One embodiment of the invention is capable of detecting that the thread is to transition from an idle condition to the non-idle condition and in response, this embodiment of the invention updates each detected general memory reference in the storage structure associated with the thread based on any updates, made to the associations to the general memory area in the reference structure, that correspond to the detected general memory references. In this embodiment of the invention then, as the memory management technique performs during the idle condition associated with the thread, as noted in the aforementioned discussion, the memory management technique can reflect changes made to the general memory area within the reference structure. When this embodiment of the invention then detects that the thread is to again begin operation within the execution environment, this embodiment of the invention can cause any changes made to the reference structure to be reflected, updated or otherwise made to the storage structure (i.e., to the stack) associated with the thread before the thread again operates within the execution environment. Accordingly, any modifications to data within the general memory area such as movement of an object from one location to another during a garbage collection process become transparent to the idle thread once that thread again becomes active.

Other embodiments of the invention include a computerized device, workstation, handheld or laptop computer, or the like configured with software and/or circuitry (e.g., a processor as summarized above) to process any or all of the method operations disclosed herein as embodiments of the invention. In other words, a computerized device or a processor that is programmed or configured to operate as explained herein is considered an embodiment of the invention.

Other embodiments of the invention that are disclosed herein include software programs to perform the method embodiment steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention. An example of such a software embodiment is a Java virtual Machine equipped with a memory management accelerator and/or a memory management process configured to operate as explained herein.

It is to be understood that the system of the invention can be embodied strictly as a software program, as software and hardware, or as hardware alone such as a processor. Example embodiments of the invention may be implemented within computer systems, processors, and computer program products and/or software applications manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Generally, embodiments of the invention provide mechanisms and techniques for performing a memory management technique such as, for example, garbage collection, by creating and maintaining a reference structure that stores or otherwise maintains references to a general memory area (e.g., a heap) on behalf of threads, processes, routines or other threads. Once a reference structure is created on behalf of one or more threads, the computerized device can operate or otherwise perform the memory management technique on a general memory area and can access the reference structure to determine what portions of the general memory area contain data already allocated or otherwise referenced by the threads. As an example, if the memory management technique is garbage collection, the garbage collector (e.g., a process or thread) can refer to the reference structure to identify those storage locations in the general memory area that are allocated on behalf of threads and can thus determine what portions of memory can be deallocated or freed for use by other threads. If the thread having an associated reference structure exists in an idle state or condition for a period of time that encompasses multiple iterations or operations of the memory management technique (e.g., multiple periodic operations of the garbage collector), performance of the memory management technique is increased by embodiments of the invention since the memory management technique can continue to utilize the reference structure created and maintained by embodiments of the invention instead of having to re-determine or re-scan the storage structure (e.g., a stack) to determine what general memory references exist on behalf of the idle thread to the general memory area.

As a specific example, embodiments of the invention do not require the garbage collector to re-scan the stack associated with an idle thread each time the garbage collector operates. By "remembering" references to the general memory area associated within the idle threads (e.g., idle Java threads) for those threads that remain idle for multiple garbage collection cycles, stack scanning is thus reduced to a one time or initial scan to initially detect such references. Thereafter, iterations of the garbage collection technique can maintain and utilize the reference structure containing only those associations to references in the general memory area associated with the idle thread, without having to traverse or re-scan the entire stack (containing other information in addition to the detected general memory references) each time garbage collection is performed.

Figure 1:
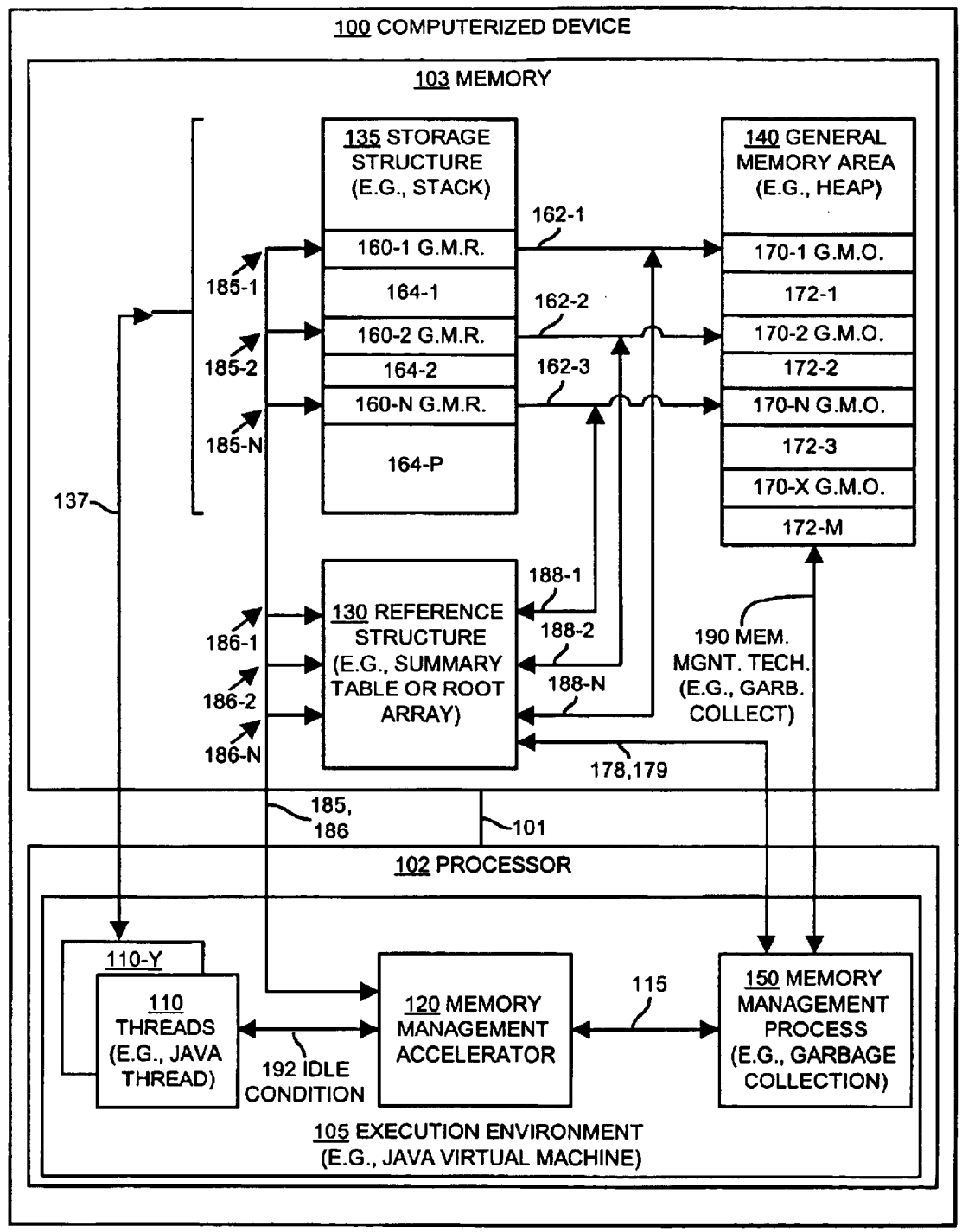
FIG. 1 illustrates an example architecture of the computerized device configured in accordance with one embodiment of the invention.

FIG. 1 illustrates an example of a computerized device 100 configured according to one example embodiment of the invention. The computerized device 100 includes an interconnection mechanism 101 such as a data bus or other circuitry that interconnects a processor 102 and a memory 103. The processor 102 may be any type of central processing unit, controller, microprocessor, or other circuitry that is capable of executing, interpreting, operating, being configured with, or otherwise performing sets of logic instructions such as computer program code. The memory 103 maybe any type of computer readable medium such as electronic semiconductor memory (e.g., Random Access Memory or Read Only Memory) or another storage medium such magnetic or optical disk storage.

The processor 102 operates in execution environment 105 that in this example is a Java virtual machine. The execution environment 105 can operate one or more threads 110-1 through 110-Y that in this example are Java threads. In addition, the execution environment 105 in the processor 102 operates a memory management accelerator 120 and a memory management process 150, that in this example is a garbage collection process.

The memory 103 is encoded with various data structures that in this example include a reference structure 130 (labeled in this example as a summary table or root array, to be explained), a storage structure 135 (labeled in this example as a stack) and a general memory area 140 (labeled in this example as a heap).

The storage structure 135 in this example is a stack that can be utilized by the execution environment 105 during operation of a thread 110 as illustrated by access communications path 137. Though not specifically illustrated, there may be a respective stack 135 for each respective thread 110. During operation of a thread 110, the operation environment 105 and/or the thread 110 may create, place, or put onto (as indicated at 137) the storage structure 135 one or more general memory references 160-1 through 160-N. In addition, the operation environment 105 and/or the thread 110 may utilize the storage structure 135 to store or push onto (and remove or pop-off) additional information 164-1 through 164-P which can include, for example, procedure call information, register values, variable data or the like. Those skilled in the art understand that a stack storage structure 135 might be used to store a variety of different types of data or information in addition to the general memory references 160 during operation of the execution environment 105 when performing the thread 110.

Within the storage structure 135 in this example, each general memory reference 160 references 162 (e.g., is a pointer to, or contains the address of) a respective corresponding general memory object 170-1 through 170-N stored within the general memory area 140 (i.e., within the heap in this example). Each general memory reference 160 may contain, for example, an address that is a pointer to (i.e., 162) a storage location within the general memory area 140 at which the general memory object 170 exists. Also in this example, the general memory area 140 includes a general memory object 170-X that represents an unused, unreferenced or garbage object within the general memory area 140. That is, there is no general memory reference 160 within a storage structure 135 for the thread 110 (or for any other thread from any other storage structure) that presently references the general memory object 170-X.

The memory management process 150 periodically generally operates as a garbage collection process or technique 190 or garbage collector as explained herein to periodically examine the general memory area 140 in order to deallocate or assign unused or unreferenced general memory objects 170-X back to free memory for use by other threads 110. During this technique 190, the memory management process 150 may operate to coalesce or consolidate the general memory objects 170-1 through 170-N into a contiguous area of allocated memory while at the same time coalescing or consolidating the unused or unallocated portions of memory 172-1 through 172-M, along with any deallocated general memory object(s) (e.g., 170-X) in order to form larger contiguous portions of deallocated or free memory. In other words, and as will be explained in more detail, the memory management process 150 may perform the memory management technique 190 to remove memory fragmentation associated with the illustrated noncontiguous portions 172 of free memory. To assist in this memory management processing, embodiments of the invention provide the memory management accelerator 120.

Generally, the memory management accelerator 120 creates and maintains the reference structure 130, which in one embodiment is a table of references (i.e., associations 188) to objects 170 in the heap. The memory management process 150 can utilize the reference structure to enhance performance of a memory management technique 190 as will be explained herein. The operation of the memory management accelerator 120 shown in FIG. 1, according to example embodiments of the invention, will now be discussed in conjunction with the processing steps illustrated in the flow chart of processing steps shown in FIGS. 2, 3 and 4.

Figure 2:
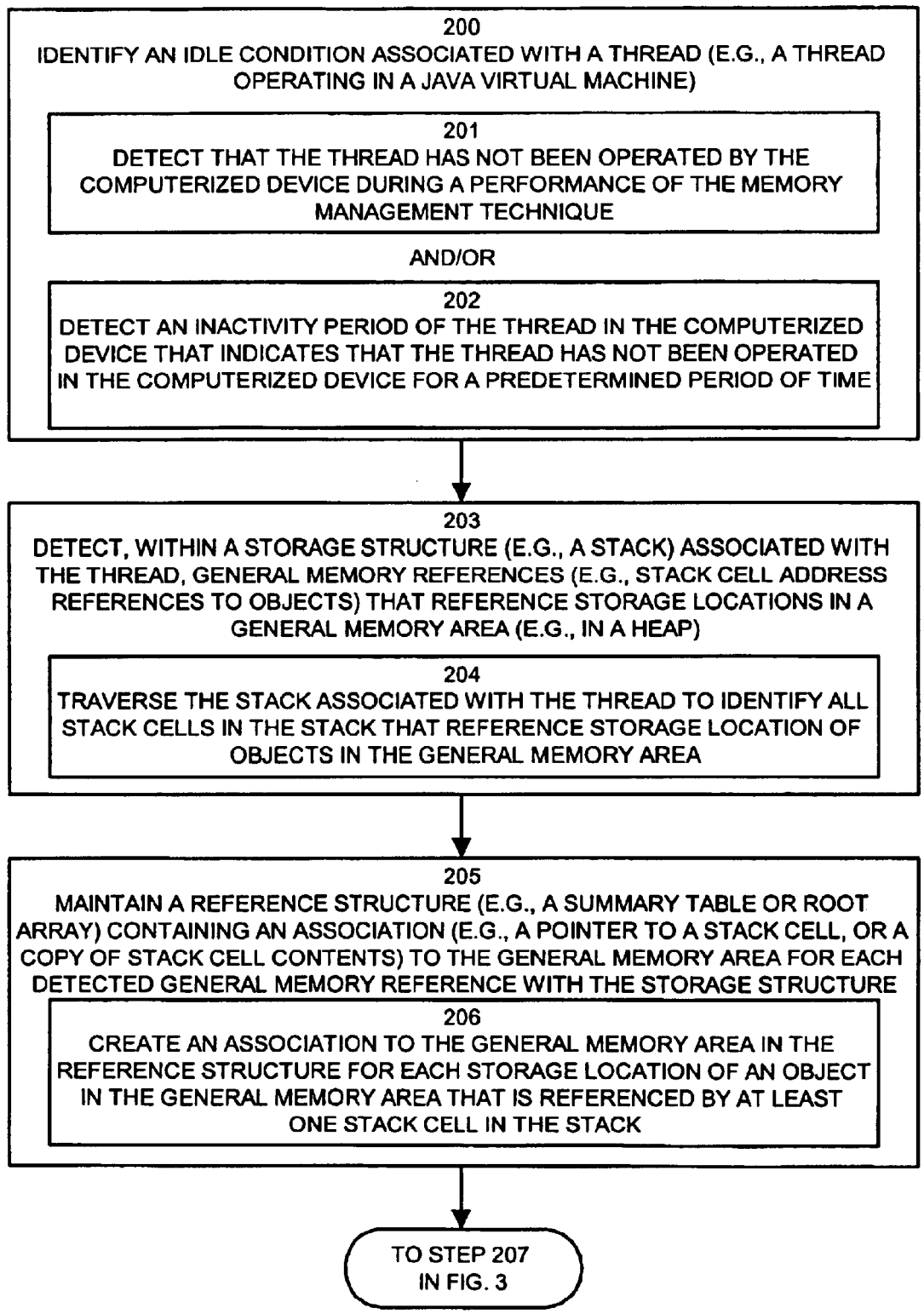
FIGS. 2, 3 and 4 are a flow chart of processing steps to perform a memory management technique according to example embodiments of the invention.

FIG. 2 illustrates a flow chart of processing steps performed within a computerized device 100 configured according to one example embodiment of the invention to perform a memory management technique according to embodiments of the invention as explained herein.

In step 200, the memory management accelerator 120 operates to identify an idle condition 192 associated with the thread 110 operating within the execution environment 105. As noted above, in this example, the thread 110 may be a Java thread operating within a Java virtual machine execution environment 105. In one embodiment of step 200, the memory management accelerator 120 operates to identify an idle condition 192 associated with the thread 110, for example, by detecting that a top frame of the storage structure (e.g., the stack 135) indicates that the thread 110 has an associated known blocking call, such as a read, that indicates that the thread will remain idle for some time period.

Steps 201 and 202 illustrate two examples of processing steps that can be performed to identify an idle condition associated with the thread 110 (i.e., to perform step 200).

In step 201, the memory management accelerator 120 detects that the computerized device has not operated the thread 110 during a performance of the memory management technique. In other works, the thread has remained idle. The memory management accelerator 120 can monitor which threads 110 operating within the execution environment 105 are currently in an idle condition 192 and can compare 115 the idle states of these threads 110 with the periodic operation of the memory management process 150. If the memory management process 150 performs multiple iterations while a particular thread 110 is continuously experiencing an idle condition 192, then this embodiment considers that the thread has an associated idle condition 192 sufficient to perform the techniques explained herein to maintain the reference structure 130 in order to improve the performance of the memory management technique 190.

Step 202 provides processing of an alternative embodiment in which the memory management accelerator 120 can identify an idle condition associated with the thread 110 by detecting an inactivity period of the thread 110 in the computerized device 100 that indicates the thread 110 has not been operated in the computerized device for a predetermined period of time. As an example, if the thread 110 is idle for a certain number of seconds, then the memory management accelerator 120 can consider that an idle condition 192 is associated with the thread 110.

Next, in step 203, the memory management accelerator 120 detects (as indicated at the arrows 185-1 through 185-N), within a storage structure 135 (e.g., a stack) associated with the thread 110 (e.g., a Java thread), general memory references 160 (e.g., stack cell address references or pointers) that reference storage locations (e.g., general memory objects 170) in a general memory area (e.g., a heap).

A more detailed example of the processing of step 203 is illustrated in step 204 in which the memory management accelerator 120 traverses the stack 135 associated with the thread to identify all stack cells 160 in the stack 135 that reference 162 storage locations of objects 170 in the general memory area 140.

Next, in step 205, the memory management accelerator 120 maintains (e.g., constructs or creates and subsequently maintains, as indicated at the arrows 186-1 through 186-N) a reference structure 130 containing an association 188-1 through 188-N to the general memory area 140 for each detected general memory reference 160 within the storage structure 135.

An example of the processing of step 205 is illustrated in more detail in step 206 in which the memory management accelerator 120 creates or maintains an association 188 to the general memory area 140 in the reference structure 130 for each storage location 170 of an object in the general memory area 140 that is referenced by at least one stack cell 160 in the stack 135. Note that in one embodiment, there may be a single association 188 for multiple general memory references 160 in the stack 135 that each reference the same storage location in the general memory area 140 (e.g., that each reference the same object 170).

In one embodiment, the reference structure is a root array reference structure and each association to the general memory area maintained for each detected general memory reference is initially a copy of the contents of the detected general memory reference from the storage structure. In such an embodiment, the memory management accelerator 120 can replace stack cell general memory references 160 with pointers 188 (i.e., on type of association 188) to entries 186 within the root array reference structure 130. In other words, the general memory references 160 are copied to the reference structure 130 and replaced, in the stack 135, with indirect references to the reference structure 130.

In another embodiment, the reference structure is a summary reference structure and the association 188 to the general memory area maintained for each detected general memory reference is a pointer to at least one location in the storage structure that contains the detected general memory references. In this embodiment then, the entries 186 in the summary table reference structure 130 represent pointers 188 to the general memory references 160 within the storage structure 135. Further details regarding the distinctions in processing between a root array reference structure and a summary table reference structure will be explained shortly.

Figure 5:
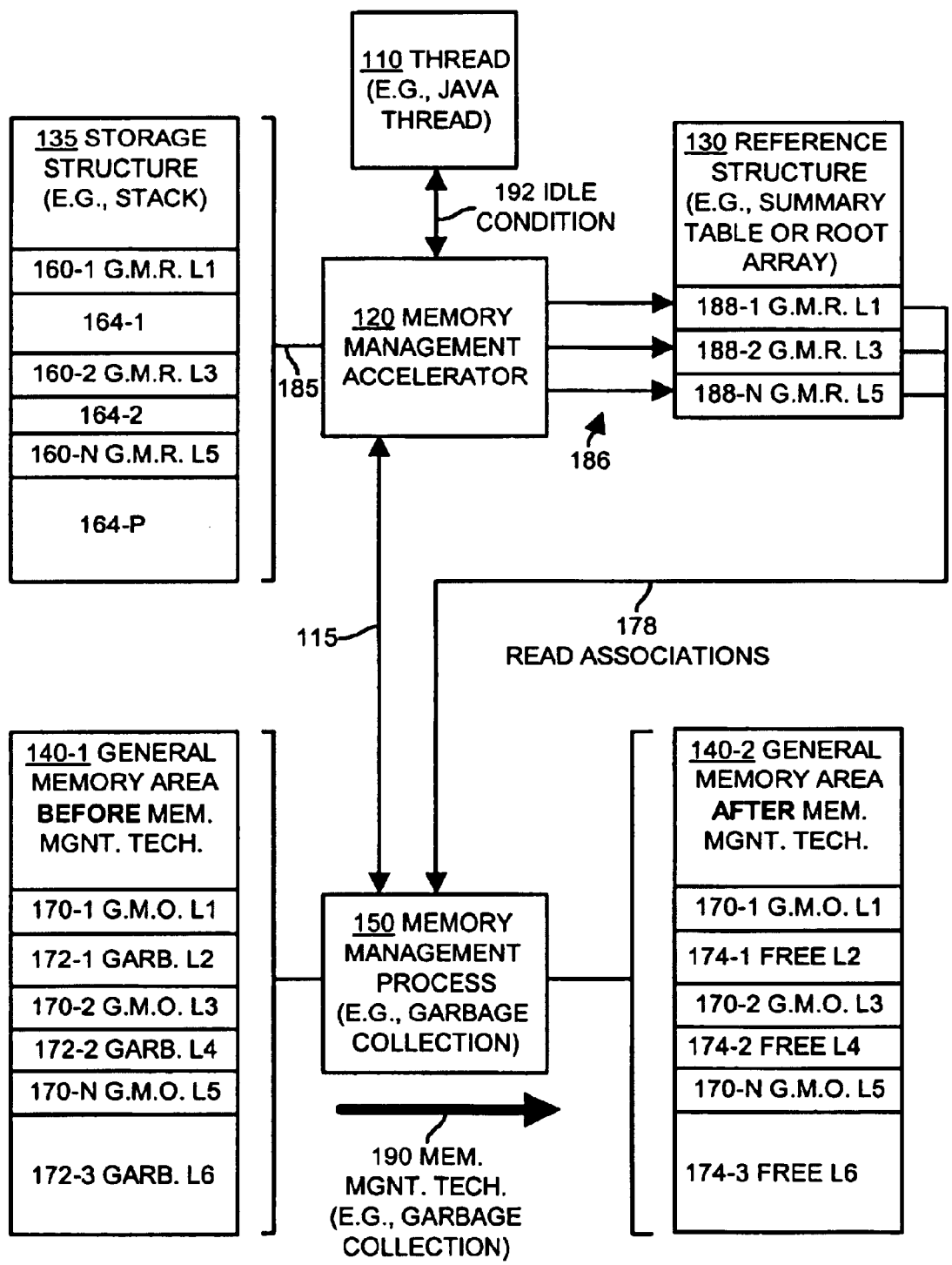
FIG. 5 illustrates an example of how a memory management accelerator operates in conjunction with a memory management process to perform a memory management technique in accordance with one example embodiment of the invention.

Directing attention now briefly ahead to FIG. 5, the top of this figure illustrates an example of how the memory management accelerator 120 examines 185 the stack storage structure 135 during the existence of the idle condition 192 associated with thread 110 in order to create and maintain 186 the reference structure 130 containing in this example, associations 188 to general memory references 160-1 through 160-N that reference or point to corresponding locations 170-1 through 170-N within the general memory area 140-1. In other words, the upper portion of FIG. 5 illustrates the operation of steps 200 through 206 as explained above with respect to FIG. 2 in order to create and maintain the reference structure 130. This example further illustrates the general memory references 160 being respectively labeled L1, L3 and L5, which correspond to the general memory objects 170-1 through 170-N stored at locations L1, L3 and L5 within the general memory area 140-1.

Also in FIG. 5, the general memory area 140-1 illustrated in FIG. 5 represents the arrangement of general memory objects 170 and unused portions of memory, or garbage locations, 172-1 through 172-3, prior to the operation of the memory management process 150. In other words, the general memory area 140-1 represents the arrangement of memory prior to garbage collection, whereas the general memory area 140-2 in FIG. 5 represents the arrangement of the general memory area after performance of the garbage collection memory management technique 190 by the memory management process 150 according to one embodiment of the invention which will be explained shortly.

Figure 3:
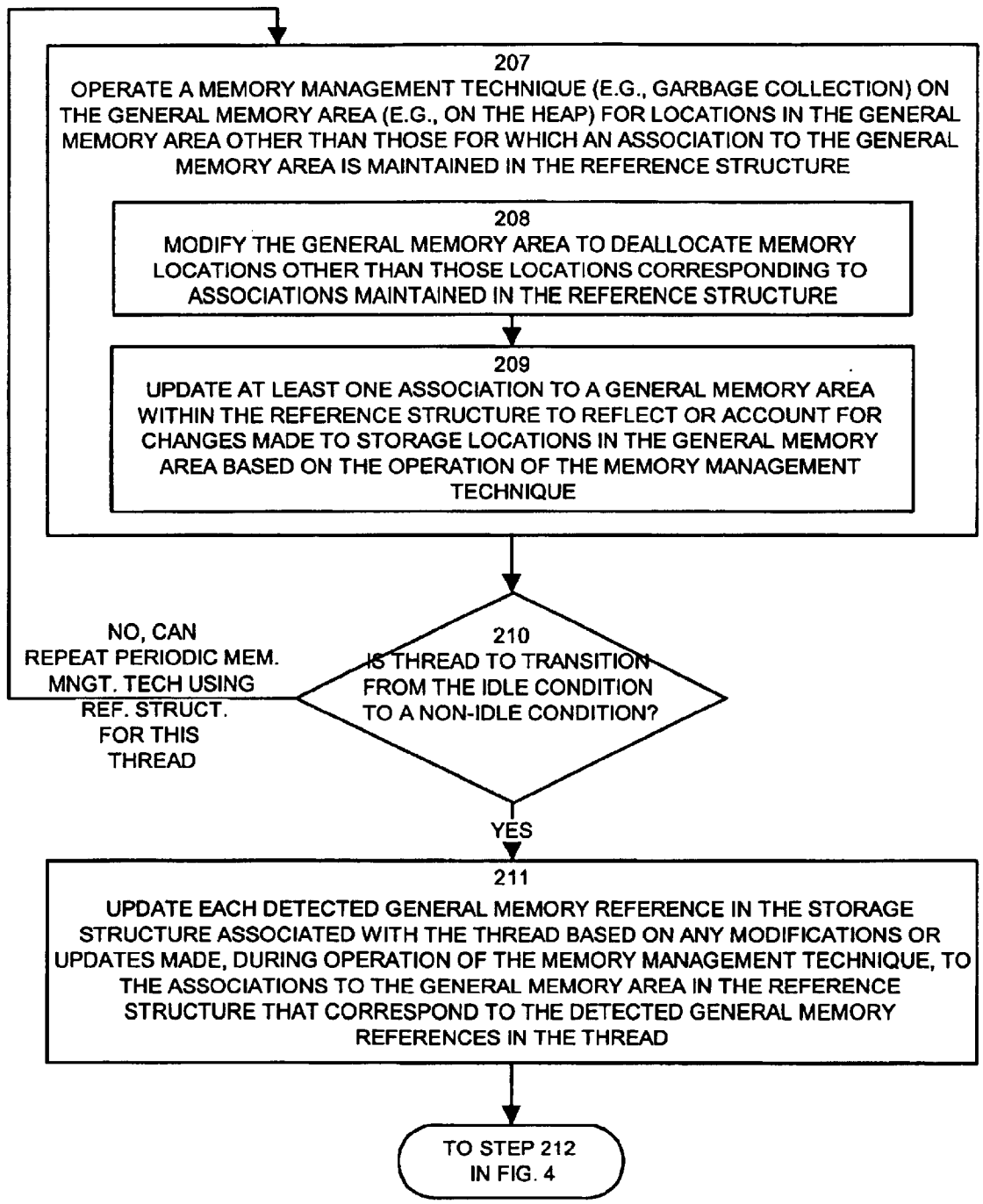

Returning attention now back to the flow chart and specifically to step 207 at the top of FIG. 3, in step 207, the memory management accelerator 120 triggers 115 (FIG. 1) the memory management process 150 to operate a memory management technique 190 such as garbage collection on the general memory area 140 for locations (i.e., unused object 170-X and garbage locations 172-1 through 172-M in FIG. 1) in the general memory area 140 other than those for which an association 188 to the general memory area 140 is maintained in the reference structure 130. That is, in one embodiment of the invention, the memory management technique 190 performs, in step 203, garbage collection on the general memory area 140 for storage locations 170-X and 172.

Briefly returning attention again to the example illustration in FIG. 5, this figure illustrates an example of how the processing of step 207 from FIG. 3 causes the memory management process 150 to operate the memory management technique 190 in order to include the garbage locations or portions 172-1 through 172-3 of the general memory area 140-1 (that indicates how this area appears before garbage collection) in a free list of memory as shown in the general memory area 140-2 (that indicates how memory appears after garbage collection). In other words, one embodiment of the invention causes the memory management process 150 to read the associations 188 (as shown at location 178 in FIG. 5) contained within the reference structure 130 to identify the general memory objects locations 170 contained within the general memory area 140-1. Based on the associations 160, the memory management process 150 can identify other locations within the general memory area such as garbage locations 172 that can be deallocated or assigned to a free memory list in order to be allocated to other threads 110 should this garbage memory be needed. Accordingly, as shown in FIG. 5, the general memory area 140-2 illustrates that the garbage portions of memory 172 have now been placed or converted into free memory portions 174-1 through 174-3 (i.e., are on a free list maintained by the execution environment 105). Note that in this example embodiment, the memory management technique does not otherwise modify the general memory area 140. That is, no movement is made to the general memory objects 170 in this example embodiment.

Returning attention now back to the flow chart of processing steps illustrated in FIG. 3, certain embodiments of the invention can provide a memory management technique 190 which modifies locations of objects 170 within the general memory area 140, for example, to overcome memory fragmentation issues. Processing steps related to the an example operation of the memory management technique 190 that modifies the general memory area 140 according to one example embodiment of the invention are illustrated in steps 208 and 209.

As indicated in step 208, operation of the memory management technique (step 207) can include modifying the general memory area 140 to deallocate memory locations (i.e., 172 and 170-X in FIG. 1) other than those locations corresponding to associations 188 maintained in the reference structure 130. That is, in step 208, the memory management process 150 can free those portions of the heap 140 for which there are no general memory reference associations maintained within the reference structure 130. In example illustrated in FIG. 1, these locations include the fragmented memory areas 172 as well as the general memory object 170-X, for which there are no longer any general memory reference associations 188 which point to or otherwise reference this general memory object 170-X. When deallocating memory portions 172 and 170-X in this manner, the garbage collection process 150 can reference 178 the reference structure 130 to identify those areas of the general memory area 140 that are presently allocated for use by the idle thread(s) 110. The memory management technique 190 may thus move the general memory objects 170 around within the general memory area 140 in order to coalesce or developed larger contiguous portion of free memory 172 into a single portion. This may include, for example, moving the general memory objects 170-1 through 170-N into a single contiguous portion of allocated memory, thus leaving the remainder of the heap 140 free for allocation to data structures required by other threads 110.

Directing attention briefly ahead to the illustration in FIG. 6, this figure is similar to that of FIG. 5 but illustrates how changes made by the memory management process 150 to the general memory area 140 during operation of the memory management technique 190 can be updated or otherwise reflected within the reference structure 130, and then subsequently, as will be explained, into the storage structure 135 associated with the thread (when that thread attempts to operate again by becoming non-idle). That is, this Figure also illustrates an example of how these changes can be further reflected in the storage structure 135 associated with a thread 110 as the thread transitions from an idle condition to a non-idle condition.

Figure 6:
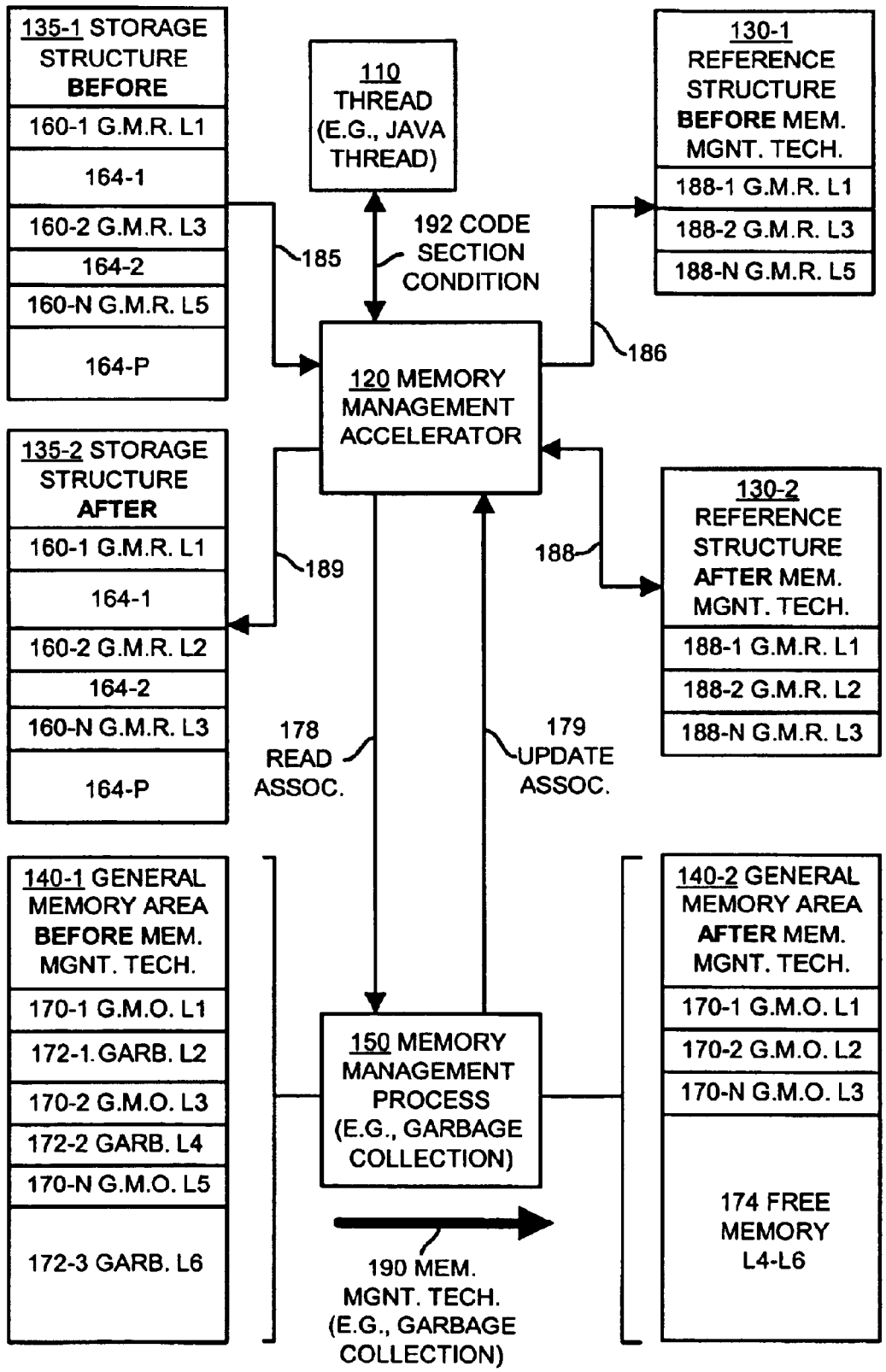
FIG. 6 illustrates another example of how a memory management accelerator operates in conjunction with a memory management process to perform a memory management technique in accordance with another example embodiment of the invention.

At the top of FIG. 6, the storage structure 135-1 represents the contents of the stack associated with a thread 110 before an operation of the memory management technique 190. As previously discussed, the memory management accelerator 120 examines the storage structure 135-1 according to the techniques explained with respect to the processing steps in FIG. 2 and maintains or otherwise produces the reference structure 130-1 which contains a list or other set of associations 188 between the locations of the general memory references 160-1 through 160-N detected within the storage structure 135-1 and corresponding general memory objects 170-1 through 170-N within the general memory area 140-1.

After creation of the reference structure 130-1, the memory management accelerator 120 triggers (as indicated at location 178 in FIG. 6) the memory management process 150 to read the associations 188 from the reference structure 130-1 in order to perform the memory management technique 190 upon the general memory area 140-1. This allows the memory management technique 190 to identify current portions of memory that are "in use." As in the aforementioned example from FIG. 5, the "before" general memory area 140-1 in FIG. 6 illustrates an example of object placement 170 and garbage memory locations 172 as a series of locations L1 through L6 as they exist prior to the operation of the garbage collection memory management technique 190. In this example operation of the memory management technique 190, the memory management process 150 performs the processing of steps 208 and 209 discussed above with respect to FIG. 3 in order to modify the general memory area 140-1 to be arranged as the general memory area 140-2 (i.e., after garbage collection has taken place). In this example then, the memory management process 150 performs garbage collection upon garbage locations 172-1 through 172-3 and consolidates the arrangement of general memory objects 170-1 through 170-N from their original respective locations L1, L3 and L5 to their new locations L1, L2 and L3 within the general memory area 140-2. The memory management technique 190 thus coalesces or consolidates the general memory objects 170 into a contiguous portion of the heap 140-2. In doing so, the memory management technique 190 also deallocates the remaining portion 174 of the general memory area which comprises memory locations L4 through L6 and assigns this area 174 as free memory.

However, in performing this memory management technique to rearrange the locations of the objects 170 within the general memory area 140, this embodiment of the memory management process 150 also performs step 209 as discussed above with respect to FIG. 3 in order to update the reference structure 130 to account for modifications made to storage locations 170 in the general memory area 140 that were made during performance of the memory management technique 190 and that relate to the associations 188 to the general memory area maintained in the reference structure 130. In other words, after rearranging the locations of the general memory objects 170 within the general memory area according to the memory management technique 190, the memory management process 150 updates the associations 188 (as indicated at location 179 in FIG. 6) in order to cause the memory management accelerator 120 to properly maintain the reference structure 130-2 according to any new locations of objects 170 within the memory 140. The reference structure 130-2 thus reflects the contents of the reference structure 130 after performance of the memory management technique.

In the specific example illustrated in FIG. 6, notice that the associations 188-1 through 188-N to general memory references 160 in the reference structure 130-1 reference respective memory storage locations L1, L3 and L5 in the general memory area 140-1 (i.e., reference locations to objects 170 at their locations within the heap prior to the performance of the memory management technique). Then, after the memory management process 150 performs the memory management technique 190 according to steps 208 and 209 (FIG. 3), the memory management process 150 operates in conjunction with the memory management accelerator 120 to update the reference structure 130-1 to appear as shown in 130-2. Specifically, after performance of the memory management technique 190, the associations 188-1 through 188-N to general memory references in the reference structure 130-2 now reference respective locations L1, L2 and L3 (as opposed to L1, L3 and L5) in the general memory area 140-2 (i.e., reference locations to objects 170 at their new locations within the heap after the performance of the memory management technique).

Note that in this example embodiment, multiple iterations of the memory management process 150 may be performed, for example, in a periodic manner by a Java virtual machine, and each time general memory objects 170 are rearranged within the general memory area 140 in order to perform garbage collection, the memory management process 150 can operate in conjunction with the memory management accelerator 120 in order to properly update or maintain the associations 188 in the reference structure 130. Also note that in this example embodiment, the storage structure 135 does not necessarily have to be updated each time the reference structure 130 changes based on operation of the memory management technique. Instead, as will be explained shortly, in this embodiment of the invention, updates can be made to the reference structure 130 during successive iterations of the memory management technique 190 and then, upon the detection of the transition of the thread 110 from an idle condition to a non-idle condition (step 210, to be explained), the memory management accelerator 120 can perform a proper update of the general memory references 160 within the storage structure 135 prior to the thread 110 operating again within the computerized device 100. Returning attention back to step 207 in FIG. 3, this is illustrated by the logic of step 210.

As note above, after performance of the operation of the memory management technique 190 in step 207 for one iteration of garbage collection, processing proceeds to step 210.

In step 210, the memory management accelerator 120 determines if the thread is to transition from its current idle condition to a non-idle condition. In other words, the memory management accelerator 120 can determine or otherwise detect when the thread is about to begin performance within the execution environment 105 (FIG. 1). In step 210, if the thread remains in an idle condition, processing can return to step 207 in order to repeat performance of the periodic memory management technique using the current state of the reference structure 135 for this particular thread 110. In other words, as long as the thread 110 remains in an idle condition, each successive periodic operation of the memory management technique 190 can utilize the current reference structure 130 for that thread 110 to increase performance of the memory management technique as explained herein. As discussed above with respect to the example illustrated in FIG. 6, upon another successive operation of the memory management process 150, the memory management process 150, upon a second iteration, utilizes the reference structure 130-2 containing associations 160 to general memory references reflecting the current locations L1, L2 and L3 of the general memory objects 170 within the general memory area 140-2 to identify currently allocated portions of the general memory area (i.e., the heap) 140.

Accordingly, the processing of steps 207 through 210 can continue to return to step 207 during the continuous idle condition of the thread 110. In step 210, once the memory management accelerator 120 detects a change in the idle condition 192 of the thread 110 (i.e., that the thread 110 is about to execute or operate again), processing proceeds to step 211.

In step 211, the memory management accelerator 120 updates each detected general memory reference 160 in the storage structure 135 associated with the thread 110 based on any modifications or updates made, during operation of the memory management technique 190, to the associations 188 to the general memory area 140 in the reference structure 130 that correspond to the detected general memory references 160 in the storage structure 135. In other words, prior to the transition of the thread from the idle condition to the non-idle condition, the memory management accelerator 120 causes any changes made during one or more iterations of the memory management technique to the reference structure 130 to be reflected within the general memory reference locations 160 in the storage structure 135 that correspond to the associations 188 in the reference structure 130. This is illustrated in FIG. 6 by the contents of storage structure 135-2 as it appears after completion of the memory management technique 190 and just prior to operation of the thread 110 (i.e., as the thread transitions from the idle condition to the non-idle condition).

There are a number of events embodiments of the invention can use as a trigger to restore stack roots from the reference structure. In one configuration, roots are restored in the stack when the thread transitions from idle to active. In another embodiment of the invention as a thread unwinds (e.g., transition from idle to non-idle), the system of the invention can restore the roots in the next underlying frame (or group of frames), such as by restoring one frame or multiple frames at a time. In yet configuration, embodiments of the invention can wait until the thread exits the idle state and begins operation and can use a "poison" reference. In such cases, when a thread accesses an object via such a poison reference, the Java virtual machine can restore the reference at that time (e.g., can restore one cell at a time, on-demand for that cell by the active thread).

In FIG. 6, note the differences between the storage structure 135-1 before operation of the memory management technique (i.e., when the thread 110 initially enters the idle condition 192) as opposed to the contents of the storage structure 135-2 after operation of the memory management technique for one or more iterations (i.e., when the thread 110 transitions from the idle condition to a non-idle condition). Specifically, notice that embodiments of the invention properly update the new locations L1, L2 and L3 of the general memory objects 170-1 through 170-N from the reference structure 130-2 to storage structure 135-2 as the thread transitions from the idle condition to a non-idle condition (i.e., just prior to performance of the thread 110 within the execution environment 105).

Figure 4:
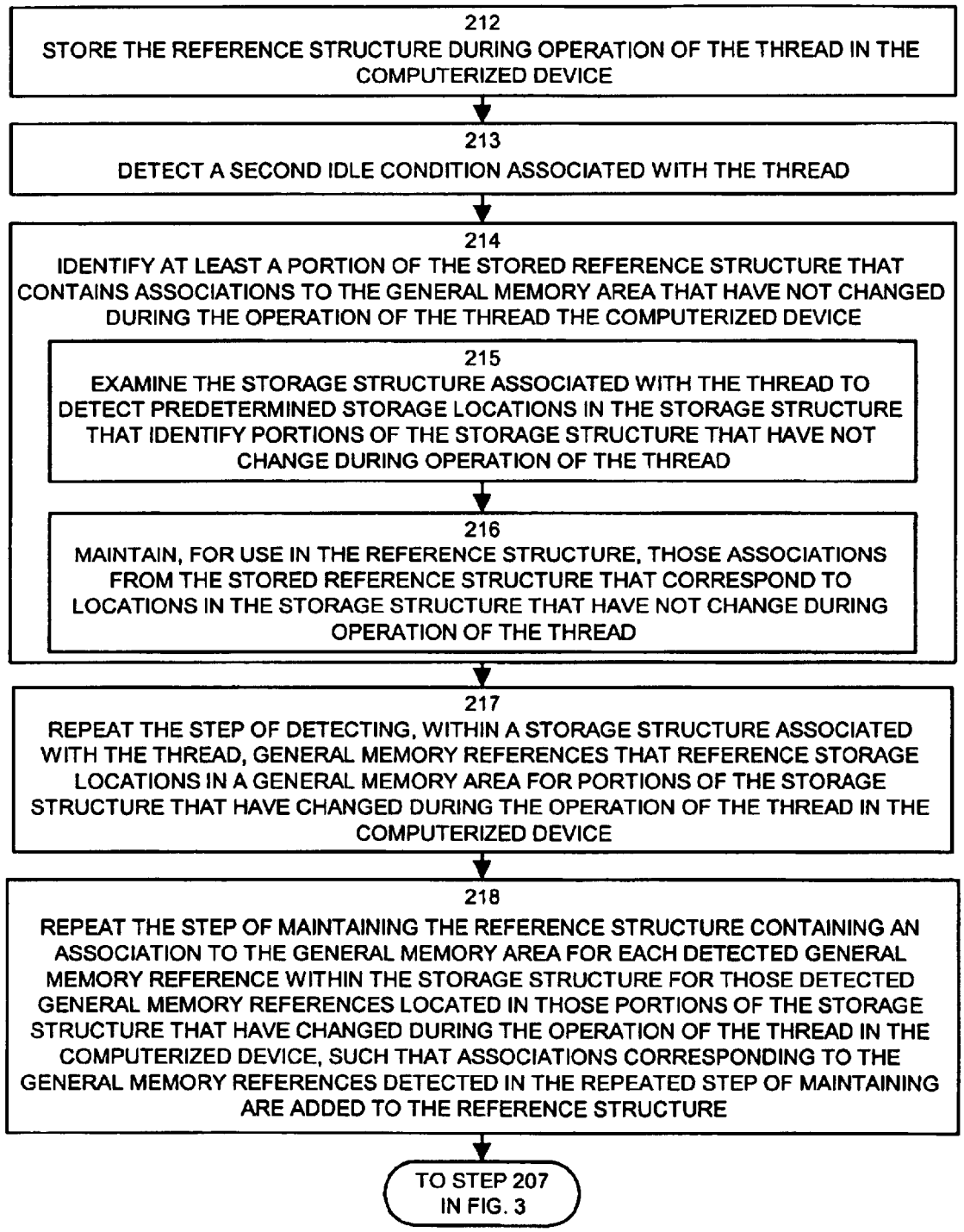

Returning attention back to step 211 in FIG. 3, after the storage structure 135 is updated, processing proceeds to step 212 shown at the top of the flow chart of processing steps in FIG. 4.

In step 212 in FIG. 4, the memory management accelerator 120 stores the reference structure 130 during operation of the thread 110 in the computerized device 100. In other words, in this example embodiment of the invention, when the thread transitions from the idle condition to the non-idle condition and again begins execution, interpretation, or other performance within the execution environment 105 (FIG. 1), the memory management accelerator 120 saves or preserves the current state of the reference structure 130. This is done in this example because the reference structure 130 represents an initial effort on the part of the memory management accelerator 120 to gather or collect the associations 188 from each general memory reference 160 in a thread's stack 135 to the corresponding location of the objects 170 within the general memory area 140. Accordingly, when the thread 110 operates in execution environment in the non-idle condition, it may be the case that certain of the stack locations, and hence their corresponding associations 188 in the reference structure 130, may not be disturbed or modified during execution or operation of the thread 110. Accordingly, in this embodiment of the invention and as will be explained shortly, by storing the reference structure 130, if the thread 110 again enters an idle condition 192, this embodiment of the invention can determine what portions of the reference structure contain associations 188 that are still valid or, in other words, still accurately associate general memory references 160 to locations of objects 170 in the heap. To do so, processing proceeds to perform step 213 through 216 in order to recover, for reuse, those portions of the reference structure 130 which were not disturbed during operation of the thread 110.

Specifically, in step 213, the memory management accelerator 120 detects a second idle condition 192 associated with the thread 110. In other words, the memory management accelerator 120 detects that the thread 110 is again idle, blocked or otherwise non-operational within the execution environment 105.

In step 214, the memory management accelerator identifies at least a portion of the stored reference structure 130 that contains associations 188 to the general memory area 140 that have not changed during the operation of the thread 110 in the computerized device 100. Steps 215 and 216 illustrate one example embodiment of the invention that allows the memory management accelerator 120 to determine which portions of the reference structure 130 are still valid, usable, or in other words, that have not changed since the former idle condition of the thread 110.

In step 215, the memory management accelerator 120 examines the storage structure 135 (i.e., examines the stack) associated with the thread 110 to detect a predetermined storage locations 160 in the storage structure 135 that identify portions of the storage structure 135 that have not changed during operation of the thread 110. In other words, in step 215, the memory management accelerator 120 can examine the stack 135 to detect predetermined or known stack cell contents within specific stack sells in the stack 135. In one embodiment of the invention, the memory management accelerator 120, during initial detection of general memory references 160 in step 203 (FIG. 2) can keep track of the stack locations of these general memory references 160 for future use in step 215. Alternatively, during startup of a thread after transition from the idle condition to the non-idle condition, the memory management accelerator 120 can keep track of certain known marker values in the stack at various locations. When the thread thus goes idle again, by starting at the top of the stack and examining consecutive stack frames, the memory management accelerator 120 in step 217 can attempt to find storage locations within the stack 135 that contain the same contents as they did prior to operation of the thread (i.e., since the last idle condition). As an example, the marker locations or values can be detected. Once a location in the stack 135 has been identified in step 215, embodiments of the memory management accelerator 120 can thus infer that the remaining contents of the stack below this location have not changed during operation of the thread 110. In other words, even though the thread 110 was operated in the execution environment 105, there is likely to be a location in the stack below which no changes were made. By identifying such a location, the memory management accelerator 120 can identify that the remaining portions of the stack below this location have not been modified during operation of the thread 110. Accordingly, processing proceeds to step 216.

In step 216, the memory management accelerator 120 maintains, for use within the reference structure 130, those associations 188 from the stored reference structure 130 that correspond to the locations in the storage structure 135 (i.e., in the stack) that have not changed during operation of the thread 110. In other words, by detecting which portions of the stack 135 have not changed during operation of the thread in step 215, all locations in the stack 135 below the unchanged locations are assumed not to have changed as well (i.e., due to the last in first out or LIFO nature of stack operation). Accordingly, those associations 188 in the stored reference structure 130 that correspond to these unchanged stack locations are assumed in step 216 to still be valid or, in other words, are assumed to point to or otherwise reference proper locations 170 of general memory objects in the general memory area 140 that have not been deallocated or moved during operation of the thread 110.

Accordingly, after completion of step 216, the memory management accelerator 120 has identified which portions of the reference structure 130 (i.e., which associations 188) can be reused during another iteration of embodiments of the invention as previously explained. By reusing these portions of the reference structure 130, the performance of the operation of detecting general memory references 160 (i.e., step 203 and 204 in FIG. 2) and maintaining the reference structure (i.e., steps 205 and 206 in FIG. 2) are increased. That is, when the thread 110 reenters an idle condition, by reusing portions of the reference structure 130, the memory management accelerator 120 only needs to examine those portions of the storage structure 135 (i.e., the stack) that have changed since the last idle condition of the thread 110 (i.e., only needs to examine those portions of the stack that have changed during operation of the thread). Thus a complete stack scan may not be required, even after a thread 110 operates for a period of time.

Accordingly, in step 217 in FIG. 4, the memory management accelerator repeats the step of detecting (i.e., repeats the general processing of steps 203 and 204), within the storage structure 135 associated with the thread 110, to detect general memory references 160 that reference storage locations (i.e., objects 170) in the general memory area 140 for portions of the storage structure 135 that have changed during the operation of the thread 110 in the computerized device 100. In other words, in step 217, the memory management accelerator only needs to examine those portions of the stack 135 that were modified during operation of the thread 110 since the last idle condition of the thread 110 that cost creation of the reference structure 130. After processing step 217, processing proceeds to step 218.

In step 218, the memory management accelerator 120 repeats the step of maintaining the reference structure 130 (i.e., repeats the general processing of steps 205 and 206 in FIG. 2) for each detected general memory reference 160 within the storage structure 135, for those portions of the storage structure 135 that have changed during the operation of the thread 110 in the computerized device 100, such that (new) associations 188 corresponding to the general memory references 160 detected in the repeated step of maintaining are added to the reference structure 130. In other words, in steps 217 and 218, the memory management accelerator 120 examines only the changed or new portions of the stack 135 in order to detect any new general memory references 160 to object locations 170 in the general memory area 140 and adds new associations 188 into the reference structure 130 for any of these newly detected general memory references 160.

In this manner, the embodiment of the invention illustrated by the processing from steps 212 through 218 provides the ability to reuse portions of the reference structure 130 and thus take advantage of former processing performed to create, develop and maintain the reference structure during its initial creation (i.e., produced a result of the initial detection of the idle condition associated with the thread 110).

It is to be understood that the aforementioned processing steps illustrate examples of processing performed according to embodiments of the invention. It is to be understood that there can be many variations made to the embodiments explained above while still achieving the same objective of those embodiments and the invention in general. For example, alterations to these processing steps may be made by those skilled in the art without changing overall effects achieved, such as, for example, providing an increase in the performance of the memory management techniques such as garbage collection within the computerized device 100. Accordingly, such modifications, eliminations or rearrangement of certain processing steps are intended to be covered within the scope of embodiments of the invention.

As an example, the processing illustrated in FIG. 4 in order to store the reference structure 130 for future use in the event to the thread again enters an idle condition 110 is optional and need not be included in all embodiments of the invention. Accordingly, an embodiment of the invention that operates to re-create a new reference structure 130 each time the thread 110 enters an idle condition is considered to be embodiment of the invention.

In another embodiment, the reference structure can be utilized by the memory management technique to better organize the heap or general memory area. As an example, the set of memory objects referenced by associations in the reference structure for threads that remain idle for long periods are not likely to be referenced for extended periods of time. As such, a garbage collection memory management technique can use this information to "promote" these object in the heap earlier in time in order to more efficiently manage or organize memory. That is, embodiments can mark or otherwise uniquely designate reference associations in the references structure that are associated with threads know to remain idle for long periods of time. When such a thread goes idle, the garbage collection mechanism can use the associations to that thread's objects from the reference structure to move or "sequester" the objects for that thread to an area in general memory that can be used to maintain long-lived objects, thus quickly freeing up the original locations for use by more active threads.

In another alternative embodiment of the invention, the processing operations of detecting general memory references (step 203), maintaining the reference structure 130 (step 205) and operating a memory management technique (step 207) are performed for a plurality of threads 110-1 through 110-Y (not specifically shown) that each have an associated idle condition. In such an embodiment, a single reference structure 130 can be used to maintain all associations 188 between general memory references 160 and storage locations 170 within the general memory area 140. There may be separate individual storage structures 135 for each different thread 110. In such an embodiment, the single reference structure contains associations to the general memory area for detected general memory references from the plurality of threads.

Figure 7:
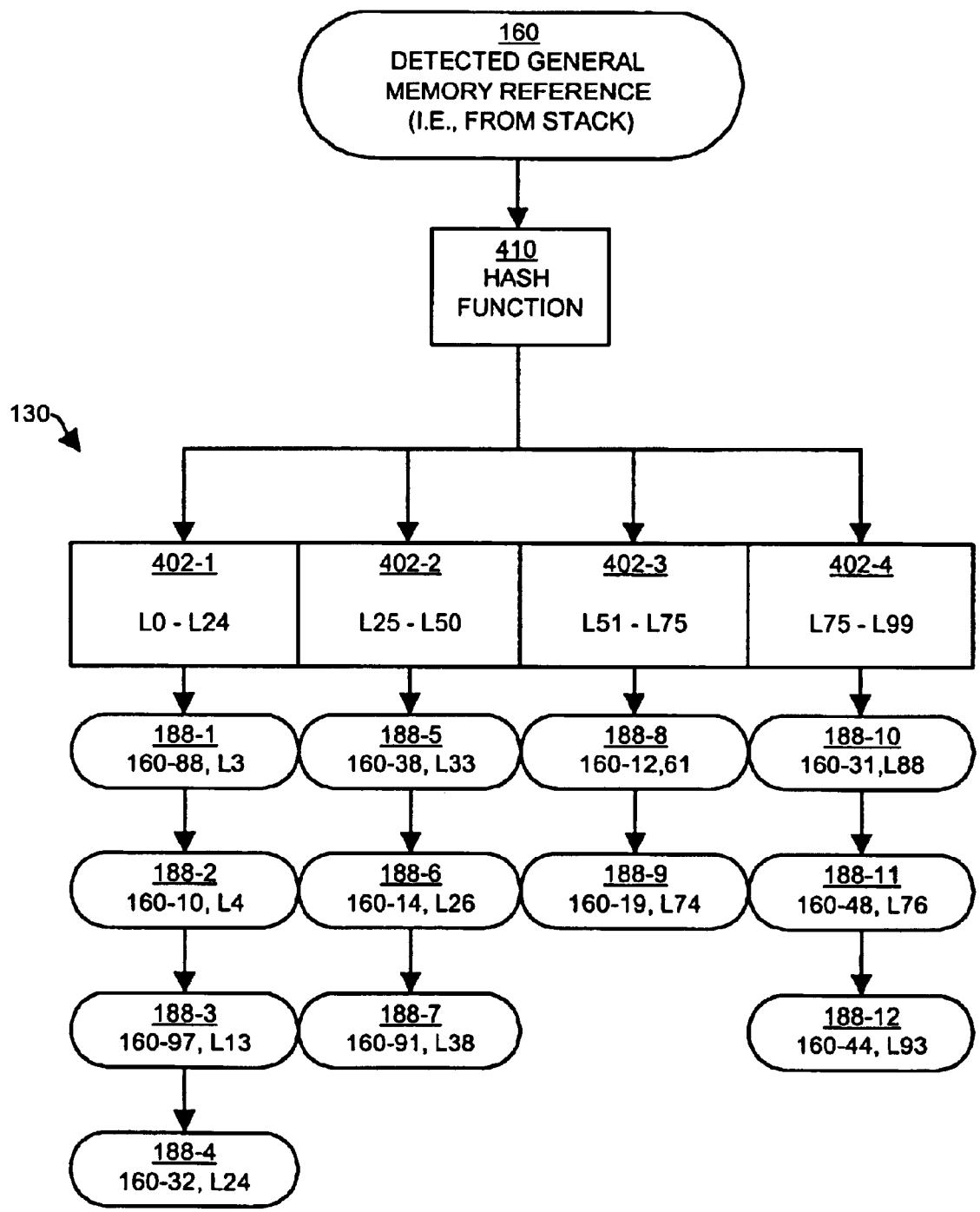
FIG. 7 illustrates an example of a multidimensional reference structure configured according to one example embodiment of the invention.

FIG. 7 illustrates an example of a multi-dimensional reference structure 130 configured in accordance with one example embodiment of the invention. That is, in another embodiment of the invention, the reference structure is a multi-dimensional reference structure 130 including indexed association storage areas 402-1 through 402-4. Each index association storage area 402 identifies a list or other set of associations 188 indexed, in this example, based on addresses of the general memory references 160 that reference objects 170 within the general memory area 140. In other words, in embodiments of the invention that utilize a single reference structure 130 to track associations 188 of general memory references 160 to objects 170 in the general memory area on behalf of multiple storage structures 135 (i.e., multiple stacks) used by multiple threads 110 that are idle, the single reference structure 130 in FIG. 7 can be arranged for efficient placement of the associations 188 to increase performance of accessing and updating associations 188 within the multidimensional reference structure 130.

In the illustrated example, each indexed association storage area 402-01 through 402-4 represents a range of storage location memory addresses L0 through L99 of the general memory area 140. As a specific example, upon detection of the general memory reference 160-19 in the stack 135 that references memory location L74 in the general memory area 140, the memory management accelerator 120 creates an association 188-9 that associated the general memory reference 160-19 to the general memory storage location L74. To place this in the multidimensional reference structure 130, memory management accelerator 120 uses the address L74 to determine which indexed associated storage area 402-3, covering the address range L75 through L75 and adds this association 188-9 below this indexed associated storage area 402-3. This allows quick access to the associations 188 based on their corresponding memory addresses L0 through L99, in this simple example.

In one embodiment of the invention then, the step of maintaining the reference structure (step 205 and 206) can include the step of identifying an indexed association storage area 402 in which to store an association to the general memory area based on an address of the object 170 in the general memory area 140 that is referenced by at least one stack cell 160 in the stack 135, as explained in the above example. The memory management accelerator 120 then stores the association 188 to the general memory area 140 at the indexed association storage area 402-1 through 402-4 identified in the step of identifying.

Also as illustrated in FIG. 7, a hash function 410 or similar technique can be used upon each detected general memory reference 160 in order to quickly determine which particular indexed association storage area 402 is to contain the association 188. In other words, embodiments of the invention can utilize the address of the object in the general memory area to access a proper indexed association storage area in the reference structure without having to search, within the reference structure, indexed association storage areas unrelated to the address of the object. A hash function, for example, which looks at or uses a certain number of, for example, low ordered bits of the memory address can be used to determine which indexed association storage area 402 in which to place the association 188.

In one embodiment, the heap or general memory area 140 is constructed or arranged in such a way that generations of objects (i.e., objects created in the same section of code or method in a thread or at the same time) are grouped by address. In such arrangements, the hash function 410 can extract the high-order bits of an objects heap offset (i.e. location 170) to properly place associations 188 into the reference structure 130, such that associations to common generations of objects 170 are located in a common portion of the reference structure 130. In such cases, the memory management process 150, during garbage collection of a single generation in the heap 140, only needs to scan the corresponding subsection in the hash table-based reference structure 130 to perform updates of association entries 188.

In another embodiment of the invention, at least one association 188 in the reference structure 130 is associated with an object in the general memory area on behalf of at least two stack cells 160 (i.e., at least two general memory references) in the stack 135. That is, in this embodiment of the invention, a single association 188 can represent the contents of two stack cells. Accordingly, if there are two general memory references 160 within a storage structure 135 associated with the thread 110, and each general memory reference 160 references the same object storage locations 170 in the general memory area 140, in this embodiment of the invention only maintains a single association 188 to this object 170 and to each of these general memory references 160. During the process of updating the storage structure 135 based on the reference structure 130 as explained above during transition of the thread from an idle condition to a non-idle condition, this embodiment of the invention modifies or updates both general memory references 160 based on the single association 188.

It is to be understood that the example reference structure in FIG. 7 is shown by way of example only. The reference structure 130 could take on other forms as well in various other embodiments of the invention. In particular, as discussed herein, the reference structure can be a summary table or summary reference structure 130 containing a list of stack cells (e.g., cell addresses) as each association 188. In such embodiments, each idle thread would have its own private summary table 130.

In other embodiments, the reference structure 130 can be a root array reference structure 130 containing entries 188 that contain pointers to objects in the general memory area 140.

In such embodiments, if the memory management technique implements a moving or copying garbage collection technique, then as a thread transitions from idle to a non-idle state, the memory management accelerator 120 can operate a Java virtual machine stack walker process to replace reference stack cells in the storage structure 135 with pointers to the root array entry. Thus, each root array entry in the reference structure 130 contains a reference. In such a configuration, each idle thread typically has its own private root array and each "live" stack cell in the storage structure 135 has its own corresponding root array entry.

In another alternate configuration of the root array reference structure 130, multiple stack cells 160 could point to same root array reference structure entry 188. In such an embodiment, at the idle to non-idle (i.e., active) transition of a thread 110, the memory management accelerator 120 can operate a Java virtual machine stack walker process to find all stack reference cells and, using the associated root array reference structure entry 188 (in this embodiment, recall that for an idle thread each stack reference cell 160 holds a pointer to a root array entry 188) the memory management accelerator 120 operating in the Java virtual machine stores the "fresh" reference value into the stack cell 160.

In yet another alternative arrangement of the root array reference structure 130 that can be used if the memory management technique implements a moving or copying garbage collection technique, at the idle to active transition of a thread, the memory management accelerator 120 can operate a stack walker process that leaves the stack cells 160 unchanged in the storage structure 135, but copies memory references into the root array 130. Thus, the root array entry contains a reference and a cell-identifier pair such as {reference, cell-identifier}. This is hybrid form, as it shares some characteristics with the summary table form. In such a configuration, each idle thread has its own private root array. At the idle to non-idle transition of a thread, the memory management accelerator 120 uses the cell-identifiers as addresses to restore the fresh reference values into the thread's 110 stack 135. This technique accelerates the idle to non-idle transition.

In still a further alternative arrangement of the root array reference structure 130 that can be used if the memory management technique implements a moving or copying garbage collection technique, at the idle to active transition of a thread, at the active or non-idle to idle thread transition, a stack walker within the memory management accelerator 120 copies references 160 into the root array reference structure 135, and then uses the vacated stack cells to form a linked list of cells that refer to the same object. Each root array entry 188 contains a reference and a point to the next reference in the root array list, such as {reference 160 to memory address 170, CellListHead}. When the thread remains idle, each vacated stack cell 160 holds a pointer to the_next vacated stack cell that refers to the same object. The last cell in the list contains a distinguished end-of-list value (perhaps 0). In other words, the CellListHead is head of a linked list of cells that refer to the same object. In a typical stack 135, multiple cells 160 may refer to the same object 170, so this form is useful to conserve storage space and reduce the size of the storage structure 135. In such embodiments, each idle thread has its own private root array and this technique can accelerate the processing required at the idle to no-idle active transition of a thread.

In still a further alternative arrangement of the root array reference structure 130 that can be used if the memory management technique implements a moving or copying garbage collection technique, at the active or non-idle to idle transition of a thread, a stack walker within the memory management accelerator 120 copies references 160 from the storage structure 135 into the root array reference structure 130 and replaces each stack cell 160 with a pointer to a root array entry 188. The root array thus contains entries 188-1 through 188-N that appear as {reference, Reference-Count}. The Reference-Count field indicates how many stack cells 160-1 through 160-N point to this root array entry 188. The entries 188 can also contain a "next" link, pointing to the next root array entry 188 in a hash equivalence class. During idle to non-idle transition of a thread, as the memory management technique replaces stack cell entries 160 with their new values (i.e., the new locations 170 of objects that they formerly referenced), the Reference-Count is decremented. When the value of Reference-Count reaches 0, the root array entry 188 could be reused or released. In embodiments where the root array entries are one-to-one with stack cells, the reference count field would be 1 for entries 188 that are in-use. In embodiments that use a single root array reference structure association entry 188 to maintain an association to multiple stack cells 160, the Reference-Count reflects the number of stack cells 160 referenced by this single association entry 188. Thus, embodiments of the invention can free portions (i.e., association entires 188) in the reference structure 130 by using reference counts to indicate when threads are referencing the information in a single entry 188.

For embodiments that use non-copying or non-moving garbage collector techniques, as a thread transitions from idle to a non-idle state, the stack-walker process of the memory management accelerator 120 copies references 160 from the root array references structure 130 to the stack 135.

It is also to be understood that in certain embodiments of the invention, there are a plurality of threads and each thread is a Java thread associated with a Java execution environment such as a Java virtual machine. In such an embodiment, the storage structure associated with each thread is a stack structure and the general memory area is a heap structure used by the Java execution environment to maintain objects on behalf of each Java thread. Also in such an embodiment, the detected general memory references are object references from the stack structure to the heap structure for objects referenced by the Java thread. Furthermore, in such an embodiment, the memory management technique is a garbage collection technique that uses the reference structure to identify objects in the heap that are in use by threads so as not to deallocate areas of the heap related to those identified objects.

According to another embodiment of the invention, the existence of a passivated thread (i.e., one for which entries exist in the reference structure 130) can be used to direct other processes in the Java virtual machine to operate accordingly. As an example, when a thread is stopped for garbage collection, the garbage collection process performs a stack scan to deflate idle monitors. However, in embodiments of the invention, threads that are idle and for which a reference structure is created (or for which a shared reference structure 130 contains entries from the stack of the idle thread to the reference structure), no deflation scan is required. Thus, embodiments of the invention can create a "passivated idle thread" state and when a thread is in such a state, garbage collection does not need to perform deflation scanning.

Embodiments of the invention can thus operate the memory management technique to perform garbage collection without requiring access to the storage structure associated with the thread during rearrangement of the general memory area. It is to be understood that the memory management process 150 and/or the memory management accelerator may be integral parts of the execution environment 105 or may be separate processes or programs.

Such variations are intended to be covered by the scope of this invention. As such, the foregoing description of embodiments of the invention are not intended to be the limiting. Rather, any limitations to the invention are presented in the following claims.

What is claimed is:

1. In a computerized device, a method for performing a memory management technique, the method comprising the steps of:

detecting, within a storage structure associated with a thread, general memory references that reference storage locations in a general memory area, the storage structure utilized by the thread during operation of the thread in the computerized device;

maintaining a reference structure containing an association to the general memory area for each detected general memory reference within the storage structure; and operating a memory management technique on the general memory area for locations in the general memory area other than those for which an association to the general memory area is maintained in the reference structure.

2. The method of claim 1 comprising the steps of:

identifying an idle condition associated with the thread;

in response to identifying the idle condition, performing the steps of detecting, maintaining and operating a memory management technique.

3. The method of claim 2 wherein:

the step of operating a memory management technique comprises the steps of:

modifying the general memory area to deallocate storage locations in the general memory area for use by threads, the deallocated storage locations being storage locations other than storage locations related to the associations to the general memory area maintained in the reference structure;

updating the reference structure to account for modifications, made to storage locations in the general memory area during operation of the memory management technique, that relate to the associations to the general memory area maintained in the reference structure; and wherein the method further comprises the steps of:
detecting that the thread is to transition from the idle condition to a non-idle condition; and
in response to the step of detecting that the thread is to transition from an idle condition to a non-idle condition, updating each detected general memory reference in the storage structure associated with the thread based on any updates made to the associations to the general memory area in the reference structure that correspond to the detected general memory references.

4. The method of claim 2 wherein the step of identifying a first idle condition associated with the thread comprises at least one of the steps of:
detecting that the thread has not been operated by the computerized device during a performance of the memory management technique; and
detecting that a top frame of the storage structure indicates that the thread has an associated known blocking call.

5. The method of claim 2 wherein the step of identifying a first idle condition associated with the thread comprises the step of:
detecting an inactivity period of the thread in the computerized device that indicates the thread has not been operated in the computerized device for a predetermined period of time.

6. The method of claim 1 wherein the step of operating a memory management technique on the general memory area comprises the step of:
performing garbage collection on the general memory area for storage locations in the general memory area other than storage locations related to the associations to the general memory area maintained in the reference structure.

7. The method of claim 6 wherein the step of performing garbage collection on the general memory area comprises the step of:
modifying the general memory area to deallocate storage locations in the general memory area for use by threads, the deallocated storage locations being storage locations other than storage locations related to the associations to the general memory area maintained in the reference structure.

8. The method of claim 7 wherein:
the reference structure is a root array reference structure;
the association to the general memory area maintained for each detected general memory reference is copy of the contents of the detected general memory reference from the storage structure; and
wherein the step of performing garbage collection on the general memory area further comprises the step of:
updating the root array reference structure to account for modifications made to storage locations in the general memory area, made during performance of the memory management technique, that relate to the associations to the general memory area maintained in the reference structure.

9. The method of claim 8 further comprising the steps of:
detecting that the thread is to transition from an idle condition to a non-idle condition; and
in response to the step of detecting that the thread is to transition from an idle condition to a non-idle condition, updating each detected general memory reference in the storage structure associated with the thread based on any updates made to the associations to the general memory area in the root array reference structure that correspond to the detected general memory references.

10. The method of claim 7 wherein:
the reference structure is a summary reference structure; and
the association to the general memory area maintained for each detected general memory reference is a pointer to at least one location in the storage structure that contains the detected general memory references; and
wherein the method comprises the step of:
in response to modifying the general memory area, updating the storage structure associated with the thread to account for modifications made to storage locations in the general memory area, made during performance of the memory management technique, that relate to the associations to the general memory area maintained in the summary reference structure.

11. The method of claim 1 further comprising the step of:
identifying a first idle condition associated with the thread;
in response to identifying the idle condition, performing the steps of detecting, maintaining and operating the memory management technique;
storing the reference structure during operation of the thread in the computerized device;
detecting a second idle condition associated with the thread;
in response to detecting the second idle condition:
identifying at least a portion of the stored reference structure that contains associations to the general memory area that have not changed during the operation of the thread in the computerized device;
repeating the step of detecting, within a storage structure associated with a thread, general memory references that reference storage locations in a general memory area for portions of the storage structure that have changed during the operation of the thread in the computerized device; and
repeating the step of maintaining the reference structure containing an association to the general memory area for each detected general memory reference within the storage structure for those detected general memory references located in those portions of the storage structure that have changed during the operation of the thread in the computerized device, such that associations corresponding to the general memory references detected in the repeated step of maintaining are added to the reference structure.

12. The method of claim 11 wherein the step of identifying at least a portion of the stored reference structure that contains associations to the general memory area that have not changed during the operation of the thread in the computerized device comprises the steps of:

examining the storage structure associated with the thread to detect predetermined storage locations in the storage structure that identify portions of the storage structure that have not changed during operation of the thread between the first and second idle conditions; and maintaining, for use in the reference structure, those associations from the stored reference structure that correspond to locations in the storage structure that have not changed during operation of the thread between the first and second idle conditions.

13. The method of claim 1 wherein:

the storage structure associated with the thread is a stack;

the step of detecting general memory references comprises the steps of traversing the stack associated with the thread to identify all stack cells in the stack that reference storage locations of objects in the general memory area; and the step of maintaining the reference structure comprises the step of creating an association to the general memory area in the reference structure for each storage location of an object in the general memory area that is referenced by at least one stack cell in the stack; and the step of operating a memory management technique comprises the step of performing a garbage collection technique to deallocate memory used by objects in the general memory area using the associations in the reference structure to identify objects in the general memory area that are in use by the thread so as to not deallocate the identified objects.

14. The method of claim 13 wherein steps of detecting, maintaining and operating a memory management technique are performed for a plurality of threads that have an associated idle condition, and wherein the reference structure contains associations to the general memory area for detected general memory references from the plurality of threads.

15. The method of claim 14 comprising the steps of:

detecting that a thread from the plurality of threads is to transition from the associated idle condition to a non-idle condition; and in response to the step of detecting that the thread is to transition from an idle condition to a non-idle condition, updating each detected general memory reference in the storage structure associated with the thread based on any modifications made, during operation of the memory management technique, to the associations to the general memory area in the reference structure that correspond to the detected general memory references for that thread that is to transition from the associated idle condition to a non-idle condition.

16. The method of claim 13 wherein the reference structure is a multi-dimensional data structure including indexed association storage areas, and wherein the step of maintaining the reference structure comprises the steps of:

identifying an indexed association storage area in which to store an association to the general memory area based on an address of the object in the general memory area that is referenced by at least one stack cell in the stack; and storing the association to the general memory area at the indexed association storage area identified in the step of identifying.

17. The method of claim 16 wherein the step of performing garbage collection on the general memory area further comprises the step of:

updating the reference structure to account for modifications made, during performance of the memory management technique, to storage locations of objects in the general memory area, the step of updating using the address of the object in the general memory area to access a proper indexed association storage area in the reference structure without having to search, within the reference structure, indexed association storage areas unrelated to the address of the object.

18. The method of claim 13 wherein at least one association in the reference structure is associated with an object in the general memory area on behalf of at least two stack cells in the stack.

19. The method of claim 1 wherein the step of operating a memory management technique comprises the step of performing a garbage collection technique without requiring access to the storage structure associated with the thread.

20. The method of claim 1 wherein:

there are a plurality of threads and wherein each thread is a Java thread associated with an Java execution environment;

the storage structure associated with each thread is a stack structure and wherein the general memory area is a heap structure used by the Java execution environment to maintain objects on behalf of each Java thread;

the detected general memory references are object references from the stack structure to the heap structure for objects referenced by the Java thread; and wherein the memory management technique is a garbage collection technique that uses the reference structure to identify objects in the heap that are in use by threads so as not to deallocate areas of the heap related to those identified objects.

21. A computerized device comprising:

a processor;

a memory encoded with a storage structure, a reference structure and a general memory area;

an interconnection mechanism coupling the memory and the processor; and wherein the processor operates an execution environment to perform a memory management technique by performing the steps of:

detecting, within the storage structure associated with a thread, general memory references that reference storage locations in a general memory area, the storage structure utilized by the thread during operation of the thread in the computerized device;

maintaining the reference structure containing an association to the general memory area for each detected general memory reference within the storage structure; and operating a memory management technique on the general memory area for locations in the general memory area other than those for which an association to the general memory area is maintained in the reference structure.

22. The computerized device of claim 21 wherein the processor operates the execution environment to perform the steps of:

identifying an idle condition associated with the thread;

in response to identifying the idle condition, performing the steps of detecting, maintaining and operating a memory management technique.

23. The computerized device of claim 22 wherein:

wherein when the processor performs the step of operating a memory management technique, the processor performs the steps of:

modifying the general memory area to deallocate storage locations in the general memory area for use by threads, the deallocated storage locations being storage locations other than storage locations related to the associations to the general memory area maintained in the reference structure;

updating the reference structure to account for modifications, made to storage locations in the general memory area during operation of the memory management technique, that relate to the associations to the general memory area maintained in the reference structure; and wherein the processor further performs the steps of:

detecting that the thread is to transition from the idle condition to a non-idle condition; and in response to the step of detecting that the thread is to transition from an idle condition to a non-idle condition, updating each detected general memory reference in the storage structure associated with the thread based on any updates made to the associations to the general memory area in the reference structure that correspond to the detected general memory references.

24. The computerized device of claim 22 wherein when the processor performs the step of identifying a first idle condition associated with the thread the processor performs the step of:

detecting that the thread has not been operated by the computerized device during a performance of the memory management technique.

25. The computerized device of claim 22 wherein when the processor performs the step of identifying a first idle condition associated with the thread the processor performs the step of:

detecting an inactivity period of the thread in the computerized device that indicates the thread has not been operated in the computerized device for a predetermined period of time.

26. The computerized device of claim 21 wherein when the processor performs the step of operating a memory management technique on the general memory area the processor performs the step of:

performing garbage collection on the general memory area for storage locations in the general memory area other than storage locations related to the associations to the general memory area maintained in the reference structure.

27. The computerized device of claim 26 wherein when the processor performs the step of performing garbage collection on the general memory area the processor performs the step of:

modifying the general memory area to deallocate storage locations in the general memory area for use by threads, the deallocated storage locations being storage locations other than storage locations related to the associations to the general memory area maintained in the reference structure.

28. The computerized device of claim 27 wherein the reference structure is a root array reference structure and wherein the association to the general memory area maintained for each detected general memory reference is copy of the contents of the detected general memory reference from the storage structure; and wherein when the processor performs the step of performing garbage collection on the general memory area further the processor performs the step of:

updating the root array reference structure to account for modifications made to storage locations in the general memory area, made during performance of the memory management technique, that relate to the associations to the general memory area maintained in the reference structure.

29. The computerized device of claim 28 wherein the processor performs the step of:

detecting that the thread is to transition from an idle condition to a non-idle condition; and in response to the step of detecting that the thread is to transition from an idle condition to a non-idle condition, updating each detected general memory reference in the storage structure associated with the thread based on any updates made to the associations to the general memory area in the root array reference structure that correspond to the detected general memory references.

30. The computerized device of claim 27 wherein:

the reference structure is a summary reference structure; and the association to the general memory area maintained for each detected general memory reference is a pointer to at least one location in the storage structure that contains the detected general memory references; and wherein the processor performs the step of:

in response to modifying the general memory area, updating the storage structure associated with the thread to account for modifications made to storage locations in the general memory area, made during performance of the memory management technique, that relate to the associations to the general memory area maintained in the summary reference structure.

31. The computerized device of claim 21 wherein the processor performs the steps of:

identifying a first idle condition associated with the thread;

in response to identifying the idle condition, performing the steps of detecting, maintaining and operating the memory management technique;

storing the reference structure during operation of the thread in the computerized device;

detecting a second idle condition associated with the thread;

in response to detecting the second idle condition:

identifying at least a portion of the stored reference structure that contains associations to the general memory area that have not changed during the operation of the thread in the computerized device;

repeating the step of detecting, within a storage structure associated with a thread, general memory references that reference storage locations in a general memory area for portions of the storage structure that have changed during the operation of the thread in the computerized device; and repeating the step of maintaining the reference structure containing an association to the general memory area for each detected general memory reference within the storage structure for those detected general memory references located in those portions of the storage structure that have changed during the operation of the thread in the computerized device, such that associations corresponding to the general memory references detected in the repeated step of maintaining are added to the reference structure.

32. The computerized device of claim 21 wherein when the processor performs the step of identifying at least a portion of the stored reference structure that contains associations to the general memory area that have not changed during the operation of the thread in the computerized device the processor performs the steps of:

examining the storage structure associated with the thread to detect predetermined storage locations in the storage structure that identify portions of the storage structure that have not changed during operation of the thread between the first and second idle conditions; and maintaining, for use in the reference structure, those associations from the stored reference structure that correspond to locations in the storage structure that have not changed during operation of the thread between the first and second idle conditions.

33. The computerized device of claim 21 wherein:

the storage structure associated with the thread is a stack;

wherein when the processor performs the step of detecting general memory references, the processor performs the step of traversing the stack associated with the thread to identify all stack cells in the stack that reference storage locations of objects in the general memory area; and wherein when the processor performs the step of maintaining the reference structure, the processor performs the step of creating an association to the general memory area in the reference structure for each storage location of an object in the general memory area that is referenced by at least one stack cell in the stack; and wherein when the processor performs the step of operating a memory management technique, the processor performs the step of performing a garbage collection technique to deallocate memory used by objects in the general memory area using the associations in the reference structure to identify objects in the general memory area that are in use by the thread so as to not deallocate the identified objects.

34. The computerized device of claim 33 wherein steps of detecting, maintaining and operating a memory management technique are performed by the processor for a plurality of threads that have an associated idle condition, and wherein the reference structure contains associations to the general memory area for detected general memory references from the plurality of threads.

35. The computerized device of claim 34 wherein the processor performs the steps of:

detecting that a thread from the plurality of threads is to transition from the associated idle condition to a non-idle condition; and in response to the step of detecting that the thread is to transition from an idle condition to a non-idle condition, updating each detected general memory reference in the storage structure associated with the thread based on any modifications made, during operation of the memory management technique, to the associations to the general memory area in the reference structure that correspond to the detected general memory references for that thread that is to transition from the associated idle condition to a non-idle condition.

36. The computerized device of claim 33 wherein the reference structure is a multi-dimensional data structure including indexed association storage areas, and wherein when the processor performs the step of maintaining the reference structure, the processor performs the steps of:

identifying an indexed association storage area in which to store an association to the general memory area based on an address of the object in the general memory area that is referenced by at least one stack cell in the stack; and storing the association to the general memory area at the indexed association storage area identified in the step of identifying.

37. The computerized device of claim 36 wherein when the processor performs the step of performing garbage collection on the general memory area further, the processor performs the step of:

updating the reference structure to account for modifications made, during performance of the memory management technique, to storage locations of objects in the general memory area, the step of updating using the address of the object in the general memory area to access a proper indexed association storage area in the reference structure without having to search, within the reference structure, indexed association storage areas unrelated to the address of the object.

38. The computerized device of claim 33 wherein at least one association in the reference structure is associated with an object in the general memory area on behalf of at least two stack cells in the stack.

39. The computerized device of claim 21 wherein when the processor performs the step of operating a memory management technique, the processor performs the step of performing a garbage collection technique without requiring access to the storage structure associated with the thread.

40. The computerized device of claim 21 wherein:

there are a plurality of threads and wherein each thread is a Java thread associated with a Java execution environment;

the storage structure associated with each thread is a stack structure and wherein the general memory area is a heap structure used by the Java execution environment to maintain objects on behalf of each Java thread;

the detected general memory references are object references from the stack structure to the heap structure for objects referenced by the Java thread; and wherein the memory management technique is a garbage collection technique that uses the reference structure to identify objects in the heap that are in use by threads so as not to deallocate areas of the heap related to those identified objects.

41. A computer program product having a computer-readable medium including computer program logic encoded thereon that, when performed in a computer device having a coupling of a memory and a processor, programs the processor to perform a memory management technique by performing the operations of:

detecting, within the storage structure associated with a thread, general memory references that reference storage locations in a general memory area, the storage structure utilized by the thread during operation of the thread in the computerized device;

maintaining the reference structure containing an association to the general memory area for each detected general memory reference within the storage structure; and operating a memory management technique on the general memory area for locations in the general memory area other than those for which an association to the general memory area is maintained in the reference structure.

* * * * *